United States Patent [19]

Negi et al.

[11] Patent Number: 4,822,099

[45] Date of Patent: Apr. 18, 1989

[54] ROTARY SEAT

[75] Inventors: Yoshitaka Negi; Hiroshi Matsuura, both of Kosai, Japan

[73] Assignee: Fujikiko Kabushiki Kaisha, Tokyo, Japan

[21] Appl. No.: 175,326

[22] Filed: Mar. 30, 1988

[30] Foreign Application Priority Data

Mar. 31, 1987 [JP] Japan ................. 62-78377
Mar. 31, 1987 [JP] Japan ................. 62-78378
Mar. 31, 1987 [JP] Japan ................. 62-78379

[51] Int. Cl.$^4$ ............................................. A47C 15/00
[52] U.S. Cl. ..................................... 297/349; 297/423; 248/425
[58] Field of Search .............. 297/349, 284, 423, 433, 297/311; 248/425

[56] References Cited

U.S. PATENT DOCUMENTS

| | | | |
|---|---|---|---|
| 2,874,993 | 2/1959 | Probst | 297/349 X |
| 3,338,622 | 8/1967 | Backmann | 297/349 |
| 3,550,953 | 12/1970 | Neale | 297/284 |
| 3,860,283 | 1/1975 | Colautti | 297/349 |
| 4,097,016 | 6/1978 | Petrucci | 297/349 |
| 4,155,593 | 5/1979 | Swenson et al. | 297/349 |
| 4,231,539 | 11/1980 | Sandham | 297/349 |
| 4,401,343 | 8/1983 | Schmidt | 297/284 |
| 4,487,452 | 12/1984 | Tanizaki et al. | 297/349 |
| 4,522,445 | 6/1985 | Goldner et al. | 297/284 |

Primary Examiner—Francis K. Zugel
Attorney, Agent, or Firm—Foley & Lardner, Schwartz, Jeffery, Schwaab, Mack, Blumenthal & Evans

[57] ABSTRACT

To turn a seat to a reverse position within a narrow space, a rotary seat is composed of a turntable, a thigh support frame, a hip support cushion disposed on the turntable, and a thigh support cushion disposed on the thigh support frame. Simultaneously when the thigh support frame is pivoted upwardly from an original position together with the thigh support cushion, a latch mechanism is released via a latch releasing mechanism, and the turntable and the thigh support frame become rotatable with the thigh support cushion remaining pivoted upwardly. The turntable is then latched into a reversed position when the thigh support frame is pivoted back down to the original position.

6 Claims, 10 Drawing Sheets

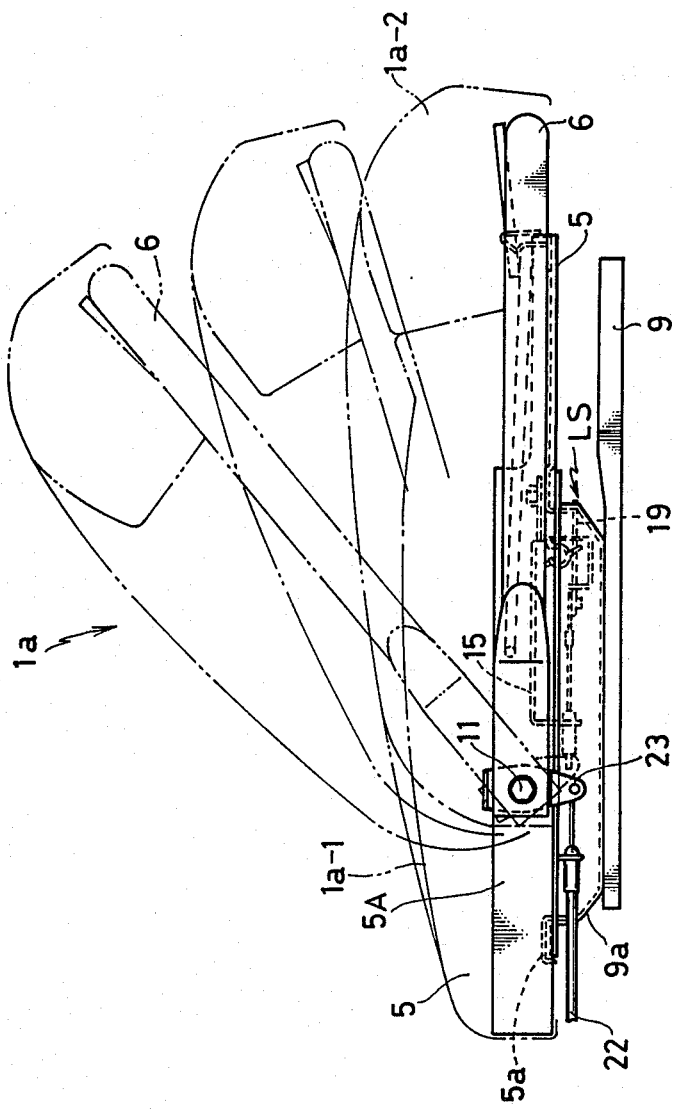

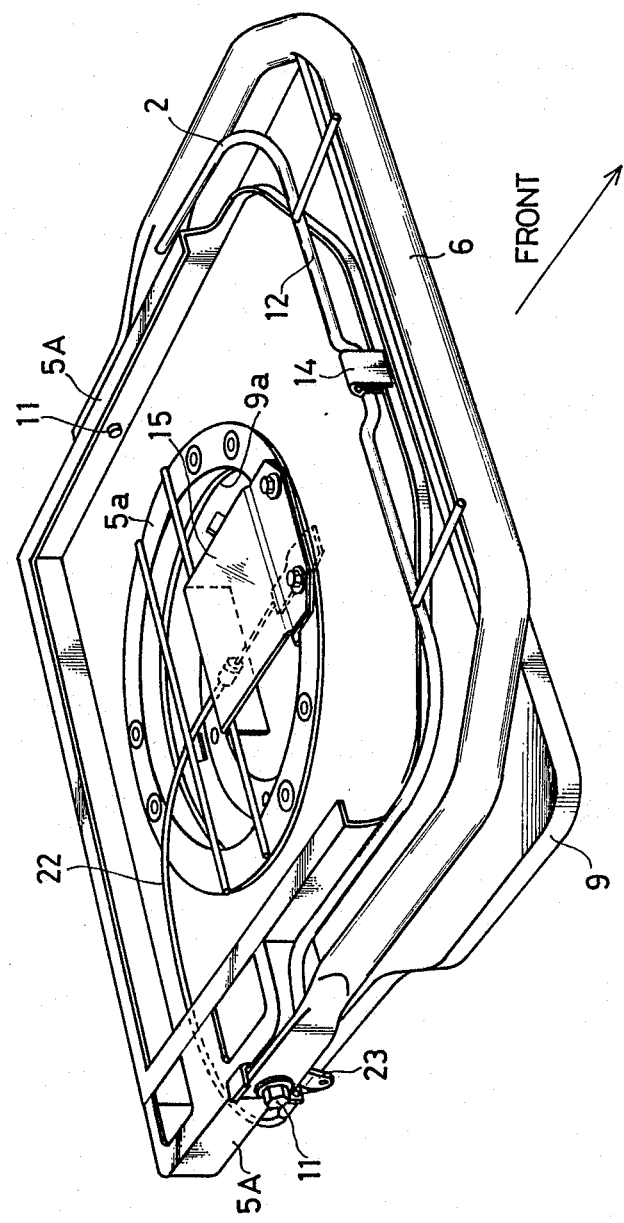

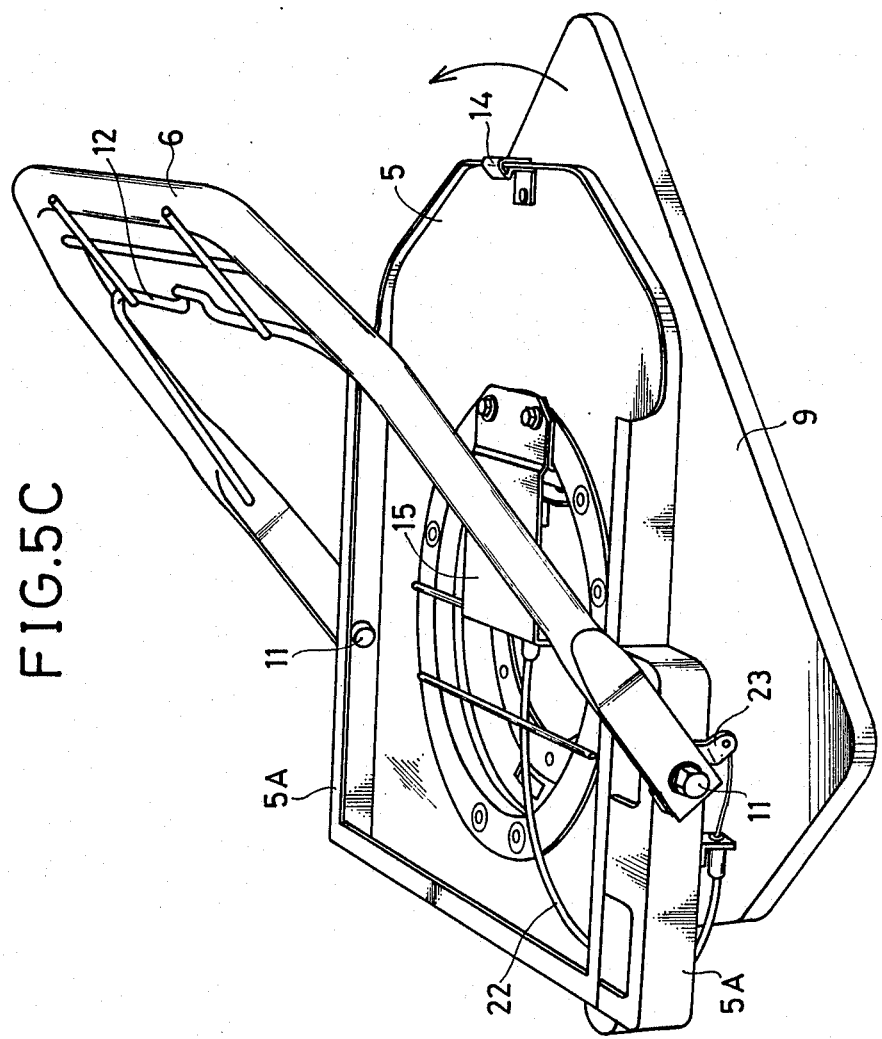

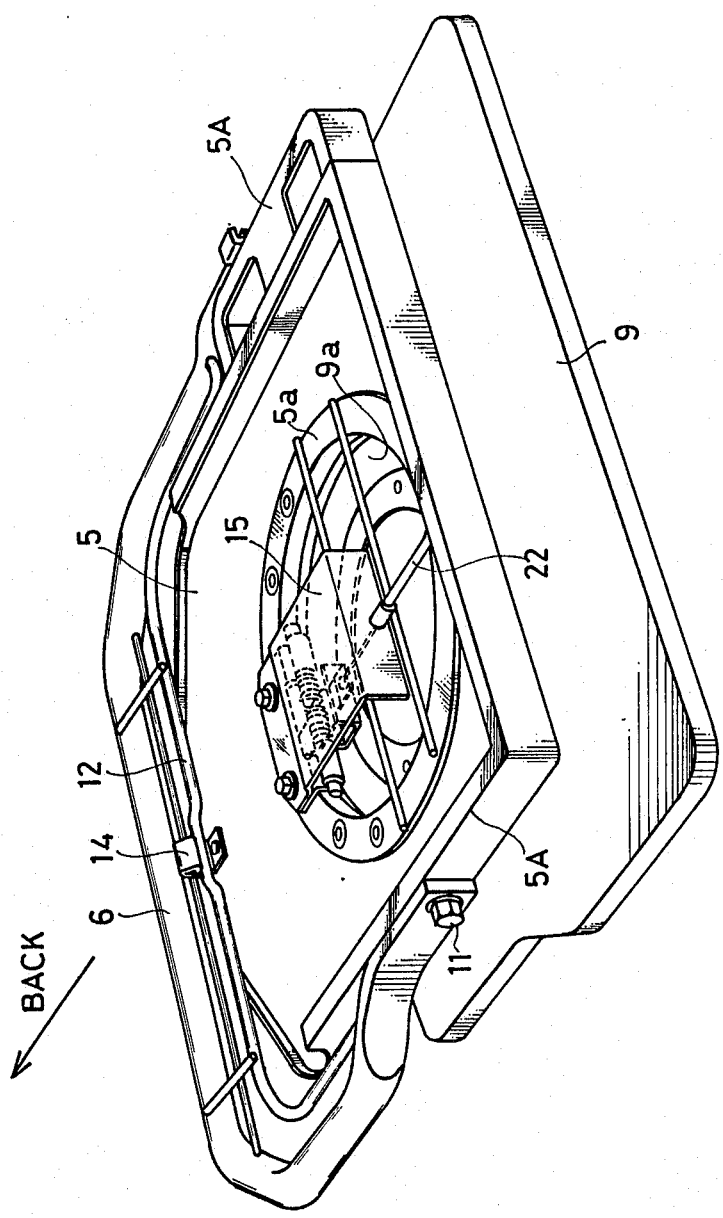

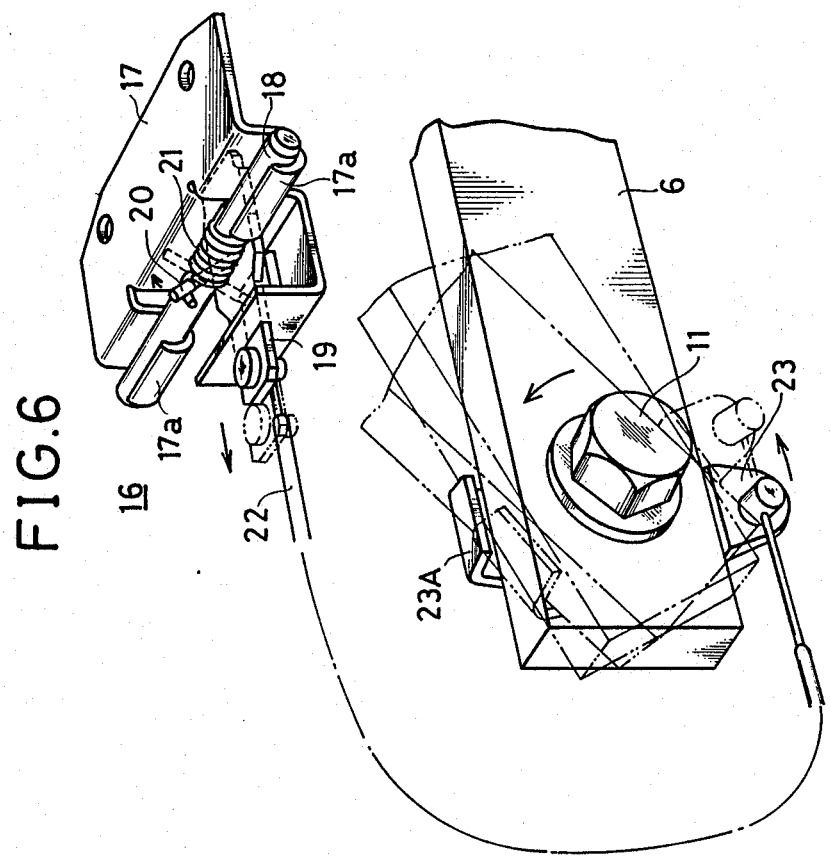

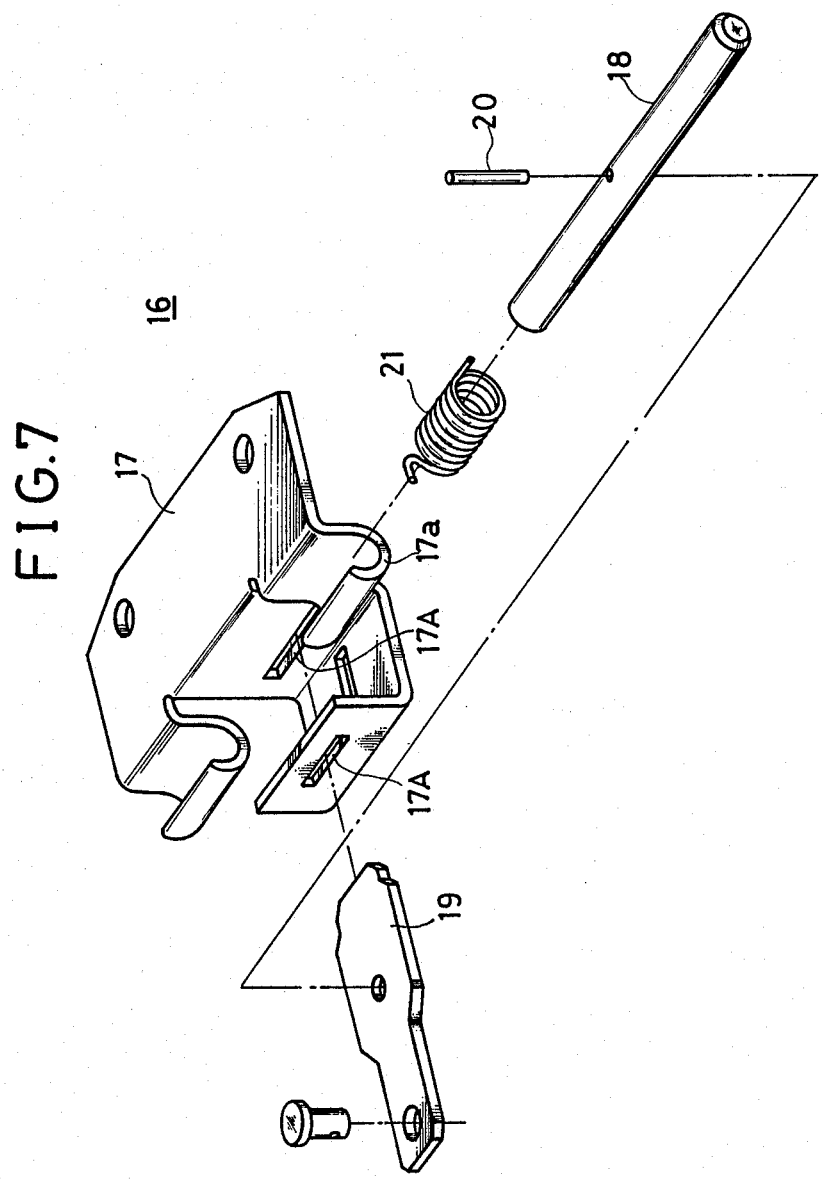

ROTARY SEAT

BACKGROUND OF THE INVENTION

1. Field of the Invention

The present invention relates to a rotary seat and more specifically to a seat rotatable even within a narrow space. For instance, this rotary seat is suitable for use as an assistant driver's seat for an automotive vehicle, which can be rotated to such a position where the assistant driver can sit facing passengers in the rear seats. These rotary seats are mounted in general passenger cars of the sedan type.

2. Description of the Prior Art

The background of the present invention will be explained with respect to its application to rotary seats for automotive vehicles. In general, a seat cushion is fixed to a turntable, and the turntable can be rotated when a latch mechanism arranged on the turntable is released, to such a position that a passenger taking the rotary seat can sit facing other passengers taking rear seats.

When the prior-art rotary seat is mounted in a relatively large automotive vehicle, no problems will arise. However, when the prior-art rotary seat is arranged and rotated in a relatively limited space within a passenger compartment, there exists a problem in that the rotary seat will interfere with other adjacent elements such as a console box, seat belt fixtures, etc.

To overcome the above-mentioned problem, it may be possible to reduce the size of the rotary seat. In this case, however, another problem will arise in that sitting comfort becomes degraded.

Further, it may be possible to design the seat cushion to lift up before seat rotation. In this case, however, since the entire seat cushion must be supported on the turntable via hinges, for instance, there arises another problem in that the seat frame structure is complicated and the rigidity of each part is reduced. In addition, since it is necessary to lift up the seat cushion before rotating the seat, the turning operation of the rotary seat is complicated and therefore troublesome.

SUMMARY OF THE INVENTION

With these problems in mind, therefore, it is the primary object of the present invention to provide a single-touch rotary seat which becomes rotatable when a part of seat cushion is pivoted upward by a single operation, without having to shifting up the entire seat cushion and without being subjected to interference with other adjacent elements.

To achieve the above-mentioned object, a rotary seat according to the present invention comprises (a) turntable means rotatable relative to the floor; (b) thigh support frame means pivotally supported on both sides of said turntable means; (c) hip support cushion means, disposed on said turntable means, for constituting a substantially middle seat cushion; and (d) thigh support cushion means, disposed on said thigh support frame means, for constituting substantially front and side portions of the seat cushion; when said thigh support frame means is pivoted down, said hip and thigh support cushion means being combined into a single complete seat cushion, and when said thigh support frame means is pivoted up, said thigh support cushion means being separated upward away from said hip support cushion means before seat rotation.

The rotary seat further comprises latch means for latching the turntable means to the floor, when said thigh support frame means is pivoted down to at least two predetermined latch positions after seat rotation; and release means for releasing said latch means from the floor, simultaneously when said thigh support frame means is pivoted up.

In the rotary seat according to the present invention, the seat cushion is divided into two, hip support and thigh support, cushions under due consideration of sitting comfort (driver's weight distribution). Further, the hip support cushion is supported on the turntable, and the thigh support cushion is supported on the thigh support frame pivotally supported on both sides of the turntable.

Therefore, it is possible to form the rotary seat on the basis of a simple structure without weakening the rigidity of the turntable or the thigh support frame.

In a seat turning operation, when only the thigh support cushion is pivoted upward, since the latch mechanism is released via the latch releasing mechanism, the seat becomes rotatable. Further, when the thigh support cushion is pivoted downward at a newly reversed position, the turntable is latched to the floor.

BRIEF DESCRIPTION OF THE DRAWINGS

The features and advantages of the rotary seat according to the present invention will be more clearly appreciated from the following description taken in conjunction with the accompanying drawings in which like reference numerals designate the same or similar elements or sections throughout the figures thereof and in which:

FIG 4 is a side view showing the same frame structure;

FIG. 5A is a perspective view showing the ordinary position of the rotary seat, in which the thigh support frame is pivoted downward and the turntable is positioned to set the seat frontward;

FIG. 5C is a perspective view showing the upward pivoted and turned position of the rotary seat, in which the turntable is turned from the state shown in FIG. 5B, with the thigh support frame kept pivoted upward;

FIG. 5D is a perspective view showing the reversed position of the rotary seat, in which the thigh support frame is pivoted downward and the turntable is positioned to set the seat rearward;

FIG. 6 is a perspective view showing a latch mechanism and a release mechanism incorporated in the rotary seat; and FIG. 7 is an enlarged exploded view of the latch mechanism.

DETAILED DESCRIPTION OF THE PREFERRED EMBODIMENTS

With reference to the attached drawings, an embodiment of the rotary seat for an automotive vehicle according to the present invention will be described by way of example.

The first feature of the rotary seat of the present invention is to pivot upward only a part of the seat cushion to prevent the seat from interfering with other adjacent elements when rotated.

The second feature of the rotary seat of the present invention is to divide the seat cushion into a hip support cushion and a U-shaped thigh support cushion under due consideration of sitting comfort, frame strength, and frame structure simplification, and to pivot upwardly only the divided thigh support cushion before seat rotation.

The third feature of the rotary seat of the present invention is to provide a latch mechanism for the turntable in such a way as to be released from the floor when only the U-shaped thigh support cushion is pivoted upward before seat rotation.

Figure 1A:
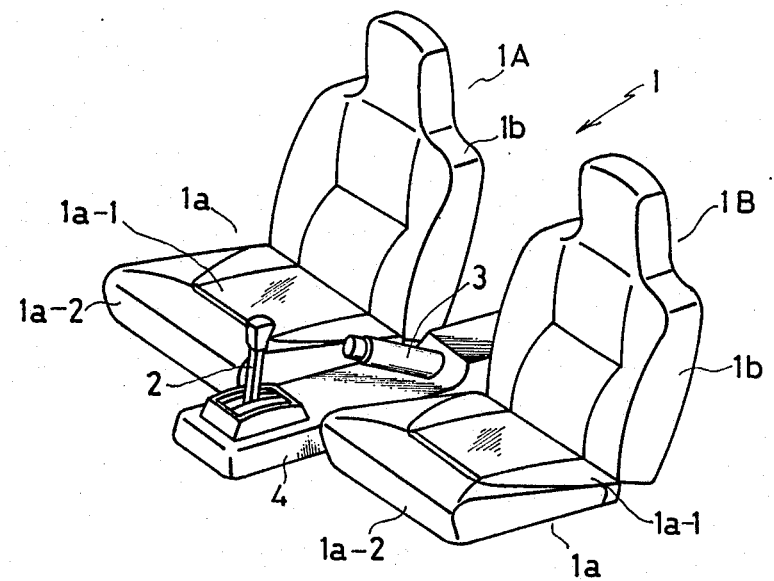
FIG. 1A is a perspective view showing a non-rotary driver's seat and rotary assistant driver's seat of the present invention, in which both seats are placed at ordinary seat positions.
Figure 1B:
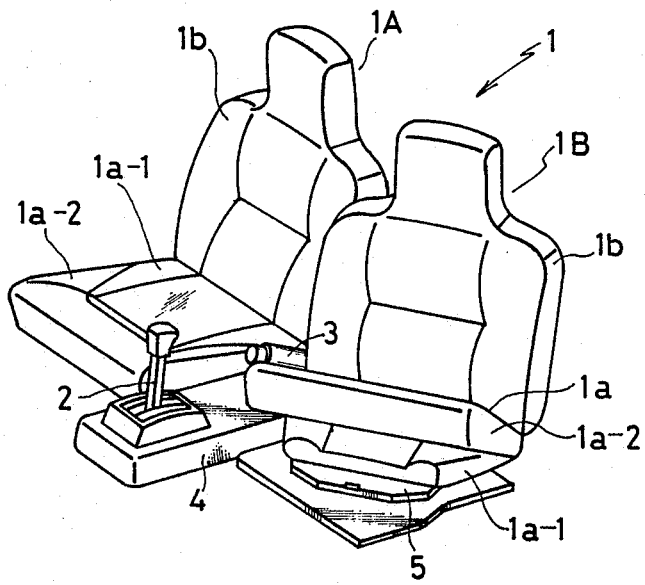
FIG. 1B is a similar perspective view showing a pair of the same seats, in which only the rotary assistant driver's seat of the present invention is rotated somewhat.

FIGS. 1A and 1B show a pair of front seats 1. The front seats 1 include a driver's seat 1A and an assistant driver's seat 1B. The two seats 1A and 1B are arranged on a floor with a console box 4 (including a shift lever 2 and a hand brake lever 3) intervening between the two seats 1A and 1B.

Figure 2A:
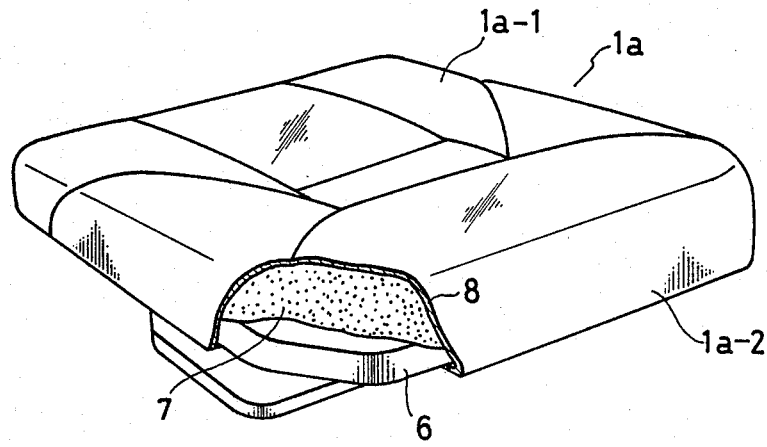
FIG. 2A a perspective, partially cutaway, view showing a seat cushion of the rotary seat of the present invention, in which a thigh support cushion is pivoted downward.
Figure 2B:
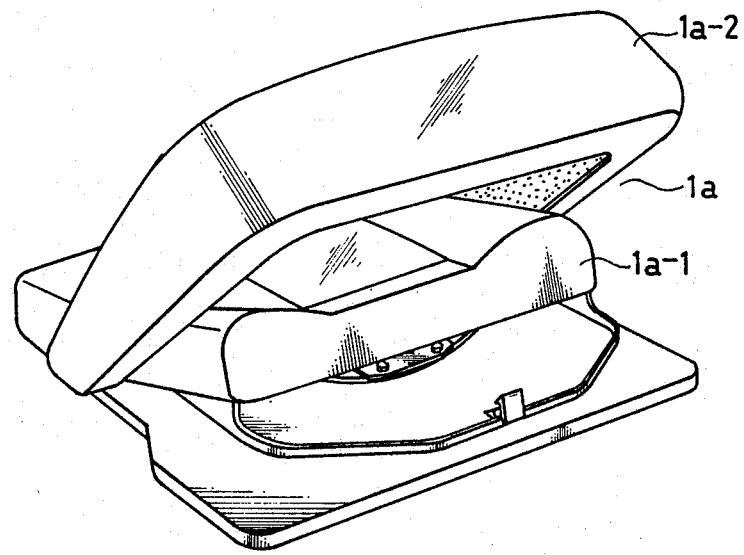
FIG. 2B is a similar perspective view showing the same seat cushion, in which a thigh support cushion is pivoted upward.

Each front seat 1A and 1B is composed of a seat cushion 1a and a seat back 1b arranged at the rear portion of the seat cushion 1a. The seat cushion 1a is divided into a hip support cushion 1a-1 mounted on a turntable 5 and a thigh support cushion 1a-2 surrounding the front and both side portions of the hip support cushion 1a-1 and mounted on a thigh support frame 6 (FIG. 2A). As depicted in FIGS. 2A and 2B, the thigh support cushion 1a-2 is formed into a roughly U-shape and supported by the thigh support frame 6 pivotally supported via pivotal axles 11 (described later) on both the side portions of the turntable 5.

Further, the seat cushion is made up of a pad 7 and a decorative material 8 for wrapping the outer surface of the pad 7. Since only the thigh support cushion 1a-2 can be pivoted upward and then rotated as shown in FIG. 1B, it is possible to rotate the seat without interfering with other elements (i.e., the console box 4, the shift lever 2, the hand brake lever 3, etc.)

Although seat cushions have never previously been divided, sitting comfort and seat rotation mobility are very important factors for dividing the seat cushion.

The shape of the seat cushion can be partitioned into a hip support cushion for mainly supporting a driver's weight and a thigh support cushion positioned a little higher than the hip support cushion so as to surround the front and both side portions of the hip support cushion. This tendency is prominent, in particular, in bucket type seats, when body weight distribution is taken into account.

Figure 3:
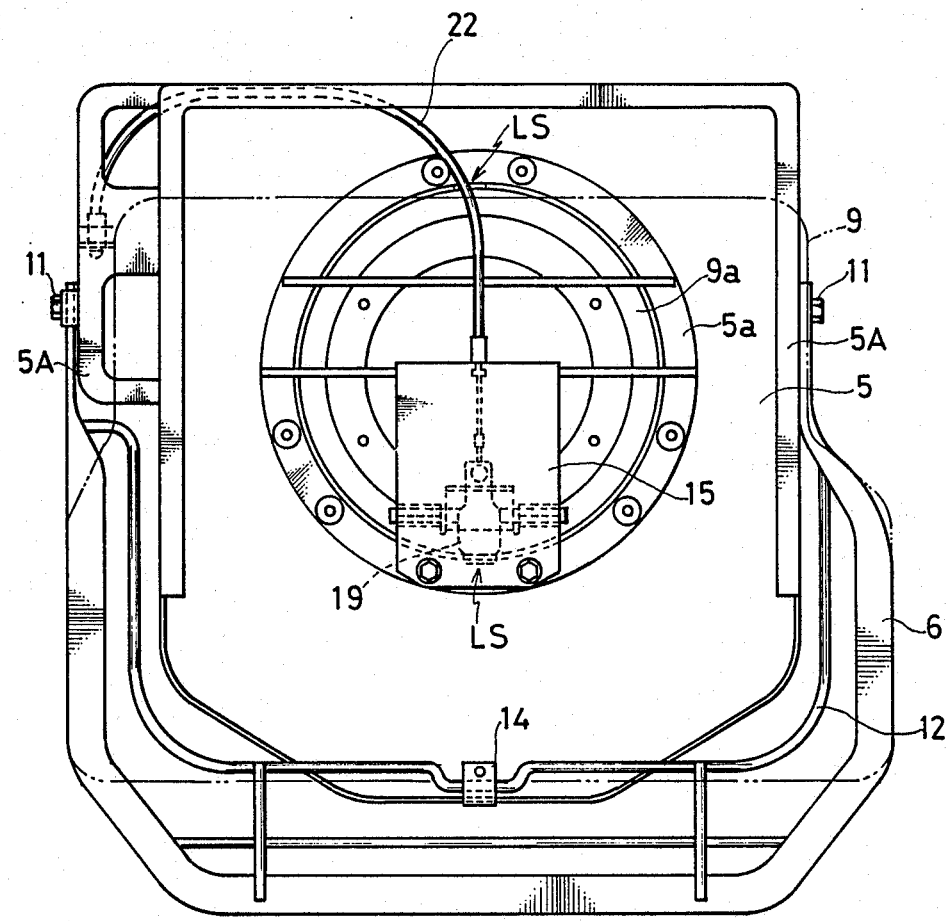
FIG. 3 is a schematic view showing a frame structure of the rotary seat of the present invention.

With reference to FIGS. 3 and 4, the structure of the seat cushion frame will be described in further detail hereinbelow. The turntable 5 is rotatably mounted on a base frame 9 fixed to a floor. In more detail, a shallow cylindrical bearing boss portion 9a is fixed at the center of the base frame 9; and a ring-shaped boss portion 5a fixed to the turntable 5 is rotatably engaged with the bearing boss portion 9a, as depicted in FIG. 5A, in such a way that the ring-shaped boss portion 5a is fitted to the inner circumference of the bearing boss portion 9a. Further, although not shown, some blocks are attached to the under surface of the flange portion of the bearing boss portion 9a to prevent the turntable 5 from being disengaged from the bearing boss portion 9a of the base frame 9.

Figure 5B:
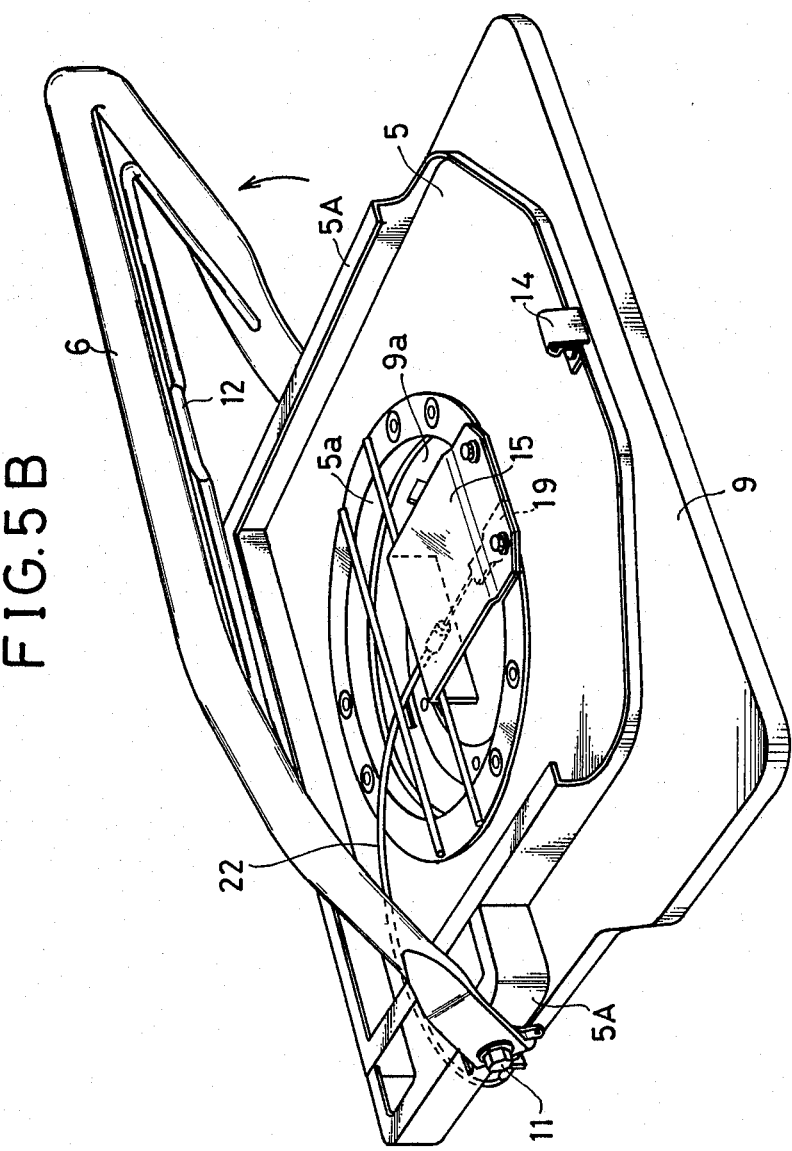
FIG. 5B is a perspective view showing the upward pivoted position of the rotary seat, in which only the thigh support frame is pivoted upward from the state shown in FIG. 5A.

Also as depicted in FIG. 5B, the thigh support frame 6 is pivotally supported via two pivotal axles 11 at two supporting portions 5A formed on both side portions of the turntable 5.

Further, a shallow U-shaped auxiliary frame 12 is provided along the front portion of the frame 6 so as to extend in the width direction of the seat. When the middle portion of this auxiliary frame 12 is elastically engaged with an engage stopper member 14 fixed at the front end of the turntable 5, the thigh support frame 6 can be retained flush with the turntable 5.

As depicted in FIG. 5A, a latch plate 15 is fixed on the upper surface of the ring-shaped boss portion 5a. A latch mechanism 16 of the turntable 5 is arranged under this latch plate 15.

FIGS. 6 and 7 show this latch mechanism 16 for latching the turntable 5 to the bearing boss portion 9a of the base frame 9 by means of a striker 19 at appropriate angular positions at which the rotary seat is fixed.

In more detail, the latch mechanism 16 comprises a bracket 17 fixed to the lower surface of the latch plate 15; a shaft 18 pivotally supported by a pair of semicircular pin support portions 17a formed in the bracket 17; a striker 19 slidably inserted into square holes 17A formed in the bracket 17 and under the shaft 18 so as to cross the shaft 18; a pin 20 for connecting the striker 19 to the shaft 18; and a coil spring 21 disposed on the outer circumference of the shaft 18.

One end of the coil spring 21 is engaged with the pin 20 and the other end thereof is engaged with the semicircular pin support portions 17a, as shown in FIG. 6. Therefore, the shaft 18 is urged in the counterclockwise direction in FIG. 6, so that the striker 19 is urged through the square holes 17A formed in the bracket 17 into engagement with a latch slot LS (shown in FIG. 4) formed in the bearing boss portion 9a of the base frame 9. A plurality of latch slots LH (e.g. two) are formed at regular angular intervals (e.g. 180 degrees) along the inner circumference of the bearing boss portion 9a. Therefore, when the striker 19 is engaged with a latch slot LH, the turntable 5 can be latched at the latch position.

On the other hand, this striker 19 can be disengaged from the latch slot LH when the thigh support frame 1a-2 is pivoted upward. To accomplish this, one end of a release wire 22 is connected to one end of the striker 19 and the other end of the wire 22 is connected to the lower end of an unlatch arm 23 disposed coaxially with the pivotal axle 11 of the thigh support frame 6, as depicted in FIG. 6. This release wire 22 is arranged on the rear part of the seat as shown in FIG. 3. Further, the upper end 23A of the unlatch arm 23 is bent into an L-shape, so as to be stopped by one edge of the thigh support frame 6 when the frame 6 is pivoted upward.

The operation of the rotary seat according to the present invention will be described hereinbelow with reference to FIGS. 5A to 5D.

When the seat cushion 1a is located in its normal (forward) position, the striker 19 of the latch mechanism 16 is engaged with a front latch slot LS formed in the bearing boss portion 9a of the base frame 9, as shown in FIGS. 3 and 5A, so that the turntable 5 is fixed to the base frame 9. Further, in this normal position, the auxiliary frame 12 of the thigh support frame 6 is elastically engaged with the engage stopper member 14.

To reverse the seat 1 when the front edge of the thigh support portion 1a-2 is first pivoted upward, as shown in FIG. 2B, the auxiliary frame 12 is disengaged from the engage stepper member 14. Since the thigh support frame 6 is pivoted upward, as shown in FIG. 5B, about the pivotal axles 11, the upper end 23A of the unlatch arm 23 is pivoted rearward by the thigh support frame 6 together therewith, as depicted in FIG. 6. Therefore, the release wire 22 is pulled to disengage the striker 19 from the latch slot LS formed in the bearing boss portion 9a of the base frame 9 against an elastic force of the coil spring 21, so that the latch mechanism is released, accompanied with a clicking sound. Therefore, the seat 1 can be rotated freely with the thigh support cushion 1a-2 pivoted upward, without interference with other adjacent elements, as shown in FIG. 5C.

When the seat 1 is rotated by 180 degrees, for instance, the thigh support cushion 1a-2 is pivoted downward horizontally to such an extent that the auxiliary frame 12 of the thigh support frame 6 is elastically engaged again with the engage stopper member 14, again with a click sound. Under these conditions, since the unlatch arm 23 is release from the thigh support frame 6, the striker 19 is urged by an elastic force of the coil spring 21 into reengagement with another latch slot LS formed on the rear side of the bearing boss portion 9a of the base frame 9, so that the turntable 5 is fixed to the base frame 9 at the reversed position, as shown in FIG. 5D.

In the same way as described above, the seat can be returned from the reverse (rearward) position to the normal (forward) position.

In the above description, the present invention is disclosed with respect to its application as an assistant driver's seat for an automotive vehicle. Without being limited thereto, however, it is possible to apply the present invention to any other seats for an automotive vehicle or other vehicles or to other special seats, for instance, those seats whose heights can be adjusted. When the present invention is applied to a height adjustable seat, the mechanism of the present invention is easily coupled to a mechanism for adjusting the height of the thigh support frame.

Further, since the seat is divided, it is possible to change the color of the external decorative material of the hip support cushion from that of the thigh support cushion to diversify color variations.

As described above, in the rotary seat according to the present invention, since the seat can be reversed by simply lifting the front edge of the thigh support cushion before turning it, it is possible to prevent the seat from interfering with other adjacent elements when being rotated, in spite of the simplified turning operation.

Further, since only the thigh support cushion is lifted upward, it is possible to simplify the structure of the frame. Further, since the seat cushion is divided into two parts, on the basis of body weight distribution, it is possible to pivot upward only a part of the seat cushion (thigh support cushion) without exerting adverse affects upon sitting comfort. Furthermore, since the latch mechanism of the rotary seat can automatically be released for rotation when only the thigh support cushion is pivoted up, it is possible to turn the seat by a single operation.

What is claimed is:

1. A rotary seat for mounting on a floor, comprising:
   (a) a base frame;
   (b) turntable means for rotation relative to the base frame;
   (c) thigh support frame means pivotally supported on both sides of said turntable means for pivoting up and down about a pivotal axis;
   (d) hip support cushion means, disposed on said turntable means, for constituting a substantially middle seat cushion;
   (e) thigh support cushion means, disposed on said thigh support frame means for constituting substantially front and side portions of the seat cushion, when said thigh support frame means is pivoted down, said hip and thigh support cushion means being combined into a single complete seat cushion, and when said thigh support frame means is pivoted up, said thigh support cushion means being separated upward away from said hip support cushion means for seat rotation,
   (f) latch means for latching said turntable means to the base frame when said thigh support frame means is pivoted down, with at least two predetermined latch positions after seat rotation; and
   (g) release means for releasing said latch means for seat rotation simultaneously when said thigh support frame means is pivoted up.

2. The rotary seat as set forth in claim 1, which further comprises means for pivotably said thigh support frame means with said turntable means to form a complete seat cushion when said thigh support frame means is pivoted down, said thigh support frame means being pivotably decoupled from said turntable means when pivoted up.

3. The rotary seat as set forth in claim 1, wherein said latch means comprises:
   (a) a striker radially movably disposed in said turntable means; and
   (b) a coil spring for urging said striker radially outward of said turntable means to latch said turntable means to the base frame.

4. The rotary seat as set forth in claim 1, wherein said release means comprises:
   (a) an unlatch arm pivotally supported on one side of said turntable means coaxially with the pivotal axis of said thigh support frame means; and
   (b) a release wire connected between said striker and said unlatch arm when said thigh support frame means is pivoted up, said unlatch arm being pivoted by said thigh support frame means to unlatch said striker via said release wire.

5. A rotary seat for mounting on a floor, comprising:
   (a) a base frame;
   (b) turntable means for rotation relative to the base frame;
   (c) thigh support frame means pivotally supported on both sides of said turntable means for pivoting up and down about a pivotal axis;
   (d) hip support cushion means, disposed on said turntable means, for constituting a substantially middle seat cushion;

(e) thigh support cushion means, disposed on said thigh support frame means, for constituting substantially front and side portions of the seat cushion, when said thigh support frame means is pivoted down, said hip and thigh support cushion means being combined into a single complete seat cushion, and when said thigh support frame means is pivoted up, said thigh support cushion means being separated upward away from said hip support cushion means for seat rotation;

(f) latch means for latching said turntable means to the base frame when said thigh support frame means is pivoted down, with at least two predetermined latch positions after seat rotation, said latch means comprising:

(1) a striker radially movably disposed in said turntable means; and (2) a coil spring for urging said striker radially outward of said turntable means to latch said turntable means to the base frame; and (g) release means for releasing said latch means simultaneously When said thigh support frame means is pivoted up, said release means comprising:

(1) an unlatch arm pivotally supported on one side of said turntable means coaxially with the pivotal axis of said thigh support frame means;

(2) a release wire connected between said striker and said unlatch arm, when said thigh support frame means is pivoted up, said unlatch arm being pivoted by said thigh support frame means to unlatch said striker via said release wire.

6. The rotary seat as set forth in claim 5, which further comprises means for pivotably coupling said thigh support frame means with said turntable means to form a complete seat cushion when said thigh support frame means is pivoted down, said thigh support frame means being pivotably decoupled from said turntable means when pivoted up.

* * * * *